United States Patent
Plunkett

(10) Patent No.: US 6,741,323 B2
(45) Date of Patent: May 25, 2004

(54) MOTION PICTURE SUBTITLE SYSTEM AND METHOD

(75) Inventor: Bradley J. Plunkett, Oxnard, CA (US)

(73) Assignee: Digital Theater Systems, Inc., Agoura Hills, CA (US)

(*) Notice: Subject to any disclaimer, the term of this patent is extended or adjusted under 35 U.S.C. 154(b) by 18 days.

(21) Appl. No.: 10/217,052

(22) Filed: Aug. 12, 2002

(65) Prior Publication Data

US 2004/0027539 A1 Feb. 12, 2004

(51) Int. Cl.[7] .................... G03B 21/32; G03B 19/18; G03B 9/08
(52) U.S. Cl. ................... 352/90; 352/133; 352/135; 352/204
(58) Field of Search ............. 352/85, 90, 133, 352/135, 204, 205

(56) References Cited

U.S. PATENT DOCUMENTS 5,123,727 A * 6/1992 Enequist ..................... 352/140
5,959,717 A * 9/1999 Chaum ........................ 352/40

FOREIGN PATENT DOCUMENTS

| WO | WO 00/52525 | * | 9/2000 | ........... G03B/19/18 |
| WO | WO 01/86350 | * | 11/2001 | ........... G03B/21/26 |

* cited by examiner

Primary Examiner—Rodney Fuller
(74) Attorney, Agent, or Firm—Eric Gifford; Blake Welcher; William Johnson

(57) ABSTRACT

In a motion picture subtitle system a shutter such as a mechanical dowser, LCLV, or E/O diffuser is inserted in the optical path between the supplemental projector and the motion picture screen and synchronized to the projection of the subtitles to reduce visual artifacts and enhance the cinematic presentation. A controller is arranged to receive the subtitles from a storage medium, to provide the subtitles to the supplemental projector in synchronism with the projection of the motion picture, and to alternately cause the shutter to pass the modulated light beam during an "on" state in synchronism with the motion picture so the subtitles are superimposed at desired times on desired portions of the motion picture and cause the shutter to attenuate the light beam during an "off" state.

27 Claims, 7 Drawing Sheets

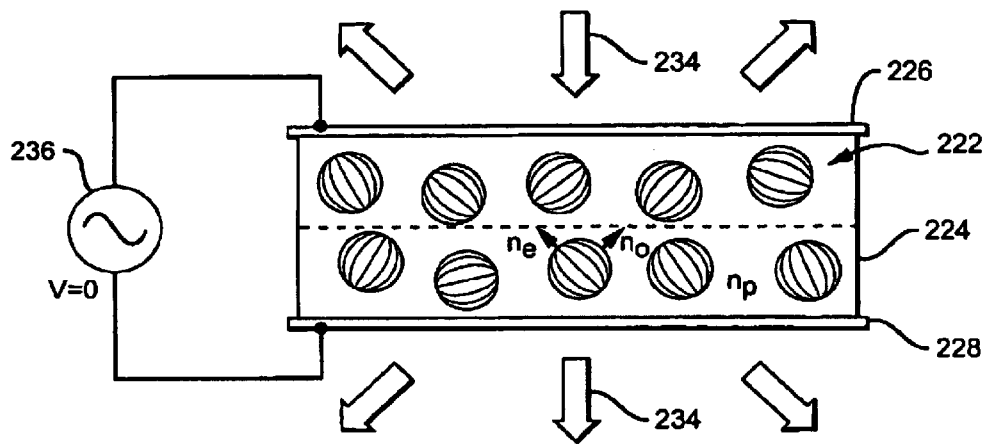
FIG. 9c
PRIOR ART
FIG. 9d
PRIOR ART
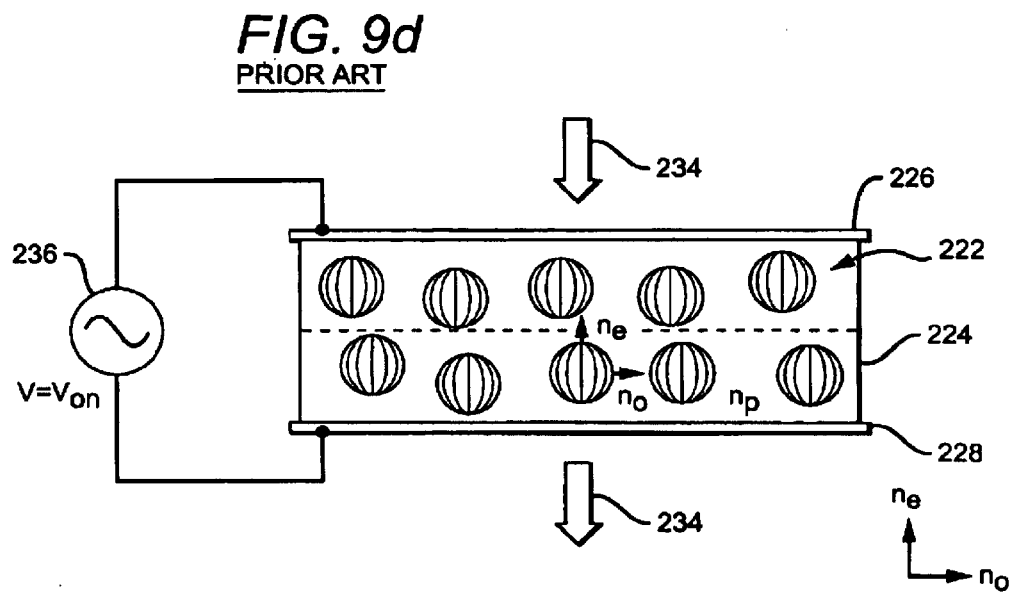

MOTION PICTURE SUBTITLE SYSTEM AND METHOD

BACKGROUND OF THE INVENTION

1. Field of the Invention

This invention relates to displaying subtitles in connection with a motion picture and more specifically to the use of a shutter that is synchronized to the projection of the subtitles to enhance the cinematic presentation.

2. Description of the Related Art

Motion pictures are filmed in many different languages, oftentimes more than one language in a given film, and distributed throughout a worldwide market. During the screening of such motion pictures there is frequently the need to display subtitles along with the moving images. The subtitles contain a translation of the motion picture sound track into the native language of the audience, and must be synchronized with the sound track and images.

Generally, the subtitles are imprinted on successive frames of the film print. The subtitles are projected onto the screen along with the images and are inherently synchronized with the sound track and the images. Imprinting is particularly time-consuming and extremely expensive. In addition, dedicating a given film to a particular language greatly reduces the flexibility in distribution.

To overcome these limitations, the motion picture industry is moving toward adoption of a dual-projector system of the type generically shown in FIG. 1 in which a primary projector 2 such as a standard film projector or a digital cinema projector projects a motion picture onto a display surface 4 such as a conventional movie screen. Subtitles are projected from a supplemental projector 6 onto a desired area 8 of the movie screen. The subtitle information is provided to the supplemental projector from a controller 10 that stores the subtitles, preferably in a digital format, in a storage medium 12. In response to a SYNC signal over line 14 from the projector, the controller 10 provides whatever subtitle is currently desired to the supplemental projector 6 for projection onto the screen 4. The SYNC signal maintains synchronism between the primary and supplemental projectors so that the appropriate subtitles are superimposed on the motion picture display at the correct times. Different techniques for synchronizing the subtitles to the motion picture are well known in the art. Specific implementations of a dual-projector subtitling system are described in European Patent Application EP 0 690 335 A1 and U.S. Pat. No. 6,046,778. U.S. Pat. No. 5,959,717 describes a dual-projector system, which is similar to the subtitling systems, but is used to add special effects and provide anti-piracy protection Since the subtitles are stored separately from the film print, a non-subtitled print can be projected from the primary projector 2 and any desired subtitles added via the supplemental projector 6. The subtitles can be changed for the same print simply by replacing the storage medium 12 with a new storage medium having a different set of subtitles. Thus, any number of different subtitle sets can be used with the same film print, or no subtitles at all, without having to modify the print or provide a different print for each different subtitle set.

SUMMARY OF THE INVENTION

The present invention provides a motion picture subtitle system that enhances the cinematic experience by reducing visual artifacts associated with current subtitling systems. Typical artifacts include a faint milky white rectangle when the subtitles are in their "off" state due to the imperfect dark state of the subtitle projector, a fluctuation in the brightness and color balance when the subtitles first transition to their "on" state, and an imbalance between the subtitle and scene brightness levels.

These artifacts are eliminated by inserting a shutter such as a mechanical dowser, LCLV, electro-optic (E/o) absorber or E/O diffuser in the optical path between the supplemental projector and the motion picture screen and synchronizing the shutter's operation to the projection of the subtitles. The supplemental projector is separate from the primary projector and arranged to modulate a light beam during the "on" state to superimpose subtitles on the motion picture. The shutter is positioned in the optical path of the supplemental projector to pass the light beam during the "on" state and to substantially attenuate the light beam during "off" states. A controller is arranged to receive the subtitles from a storage medium, to provide the subtitles to the supplemental projector in synchronism with the projection of the motion picture, and to alternately cause the shutter to pass the modulated light beam during "on" states in synchronism with the motion picture so the subtitles are superimposed at desired times on desired portions of the motion picture and cause the shutter to attenuate the light beam during "off" states.

During the "off" state the shutter blocks, absorbs or widely scatters any light from the supplementary projector depending upon the particular shutter configuration thereby eliminating the undesirable milky white rectangle artifact. The shutter itself is preferably not limited to on/off (pass/attenuate) states but is rather characterized by variable transmission between the two extremes. Accordingly, to eliminate the transient fluctuations associated with the subtitle's transition to the "on" state, the transmission of the shutter is preferably ramped from its attenuation state to its pass state. The variable transmission property is also used to adjust the subtitle brightness in accordance with the scene brightness of the motion picture.

In one particular embodiment, the shutter is an electro-optical diffuser made of a polymer dispersed liquid crystal (PDLC) material. In the "off" state, the PDLC droplets are randomly aligned so that their refractive index does not match that of the polymer in which they are dispersed. The material appears translucent and causes the light to scatter. When an electric field is applied across the material, the PDLC droplets reorient so that their refractive index matches that of the polymer. The material is rendered substantially transparent and passes the light with very low loss and minimal scattering in this "on" state. The material's transmission properties can be continuously varied across the entire surface by adjusting the applied electric field.

These and other features and advantages of the invention will be apparent to those skilled in the art, from the following detailed description of preferred embodiments, taken together with the accompanying drawings, in which:

BRIEF DESCRIPTION OF THE DRAWINGS

FIGS. 9a through 9d are detailed illustrations of the E/O diffuser.

DETAILED DESCRIPTION OF THE INVENTION

The present invention provides a dual-projector motion picture system that enhances the cinematic experience by reducing visual artifacts associated with known dual-projector subtitling systems. The lower cost digital projectors used to project the subtitles use a modulator such as a liquid crystal display (LCD) or a MEMS mirror chip such as Texas Instruments' DLP to modulate a light beam from a high intensity lamp. The off or dark state of these digital projectors is relatively poor compared to film. Thus, when the subtitles are in the "off" state light from the digital projector leaks through and projects a faint milky white rectangle on the motion picture. Furthermore, when the subtitles first transition to the "on" state, the picture may appear to exhibit a temporary fluctuation in the brightness and color balance. In addition, subtitles are typically projected at maximum brightness whereas the scene brightness can vary substantially. These effects are ameliorated by placing a shutter such as a mechanical dowser, LCLV, E/O absorber or E/O diffuser in the supplemental projector's optical path and synchronizing its operation to the projection of the subtitles. To compensate for the brightness artifacts, the shutter preferably exhibits variable transmission properties between its transparent on state and its translucent off state.

Figure 2:
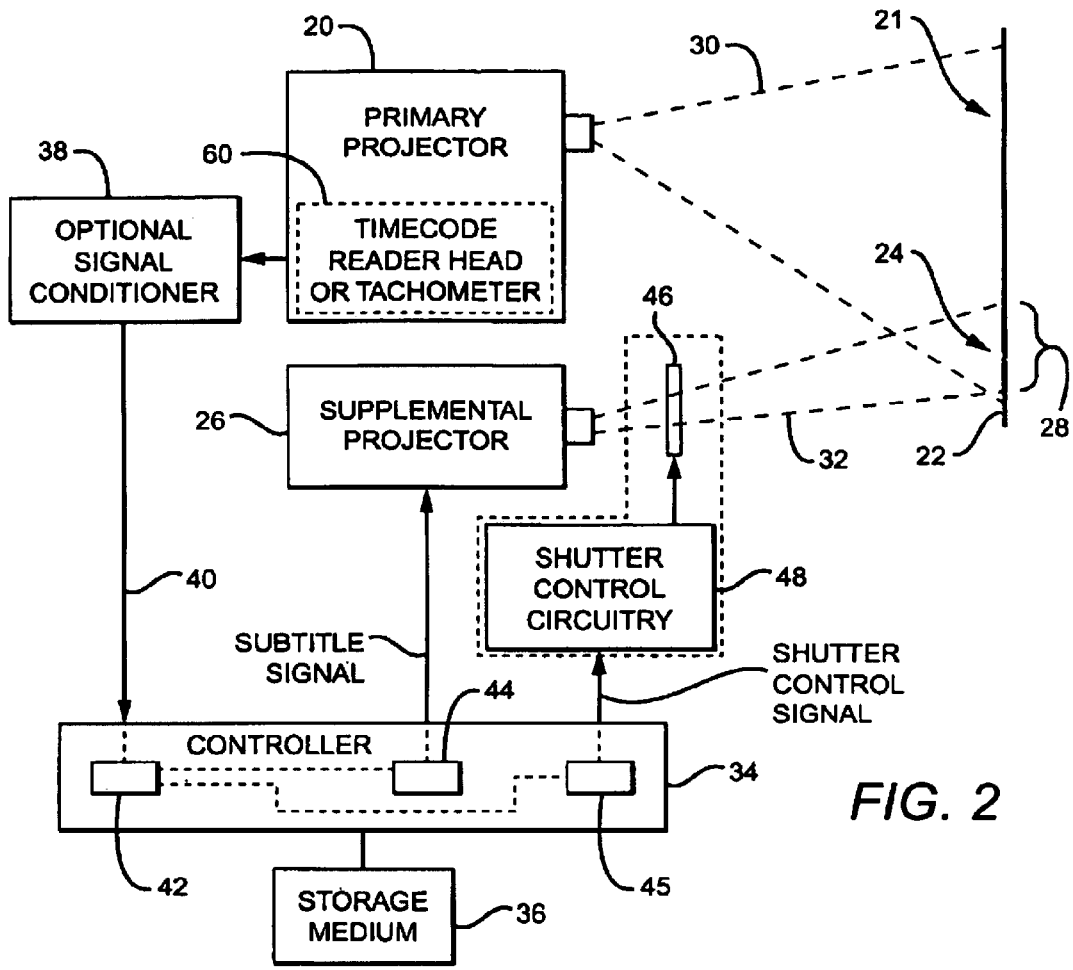
FIG. 2 is a block diagram of a dual-projector motion picture system including a shutter in accordance with the present invention.

As shown in FIG. 2, a primary projector 20 such as a conventional film projector or a digital cinema projector projects a motion picture 21 onto a display surface 22 such as a conventional movie screen. Subtitles 24 are projected from a supplemental projector 26 such as a digital video projector or digital image projector onto a desired area 28 of display surface 22. The primary and supplemental projectors modulate respective light beams 30 and 32 to form the motion picture and subtitle images. The lower cost digital projectors used to project the subtitles use a modulator such as a LCD or a DLP chip to modulate the light beam from a high intensity lamp.

The subtitle information is provided to the supplemental projector from a controller 34 that stores the subtitles, preferably in a digital format, in a storage medium 36. The subtitle information is preferably stored in an independent medium but may be stored on a medium such as a CD with the audio track or even conceivably on the film itself. A time code reader head or tachometer 60 provides SYNC signal to an optical signal conditioner 38, which conditions the signals to form uniform SYNC pulses, which are sent over line 40 to controller 34, which in turn provides whatever subtitle is currently desired to the supplemental projector 26 for projection onto the screen 22 during an "on" state. The SYNC signal maintains synchronism between the primary and supplemental projectors so that the appropriate subtitles are superimposed on the motion picture display at the correct times.

To eliminate the visual artifacts, a shutter 46 such as a mechanical dowser, LCLV, E/O absorber/or E/O diffuser is positioned in the optical path between supplemental projector 26 and screen 22 to selectively pass and attenuate (block/absorb/diffuse) modulated light beam 32 in synchronism with the projection of the subtitles. In concert with the presence or absence of a SYNC signal, the controller sends a control signal to shutter control circuit 48, which alternately causes the shutter to pass modulated light beam 32 during the "on" state in synchronism with the motion picture so the subtitles are superimposed at desired times on desired portions of the motion picture and causes the shutter to substantially attenuate the light beam during "off" states. This eliminates the milky white rectangular artifact. The shutter control circuit can, with certain implementations of the shutter that have variable transmission, perceptibly ramp the shutters "on" state to minimize any fluctuations in brightness or color balance, or control the shutter's transparency to adjust subtitle brightness.

The SYNC signal on input SYNC line 40 can have different formats, depending upon how the system is set up. Many film prints are provided with a time code distributed along the length of the film, with each time code unit consisting of a digital data string that uniquely identifies its location along the film. Some presently available time codes include the DTS (Digital Theater Systems, Inc.) format of 24-bit digital words, each word beginning with a synchronizing series of bits, and the SMPTE (Society of Motion Picture and Television Engineers) standard. If the film being projected has a time code, the time code is read at the primary projection site, conditioned and provided as the input SYNC signal to the controller 34. The storage medium 36 would include a sector corresponding to each time code location for which a subtitle is desired, with each sector frame including the corresponding time code and subtitle (or other visual display) information. When a particular time code unit is input to the controller as a SYNC signal, the corresponding memory storage frame is accessed and its subtitle information transmitted to the supplemental projector 26, and a control signal is directed to the shutter to switch the shutter to its "on" state so that the subtitle is superimposed on the motion picture. The storage medium 36 can include frames for all time code units, with blank frames for the time code units that do not require a subtitle, or only frames for time code units with corresponding subtitles.

If the film does not have a time code, an equivalent film location signal can be provided by using a film frame counter (tachometer) to count the film frames as the film is projected. This is not as desirable as a time code, however, because of the common practice of editing film prints after distribution. If portions of a film print have been edited out and removed, for example to eliminate damaged portions of the print or to reduce the length of the movie, the remaining time code units will still maintain synchronization with the subtitle information With a tachometer, on the other hand, removing a portion of the film after the subtitle storage medium has been set up for the full film length will result in a loss of synchronism when the first edit is encountered, and increasing synchronism losses for each subsequent edit.

The SYNC input could also be provided as serial data from another computer, as in a show controller configuration. In this case the SYNC signal can be generated at a remote location, without obtaining it directly from the film being projected. Alternately, an external source could generate a SYNC signal for both the primary and supplemental projectors.

The shutter control circuit 48 is preferably driven off the same SYNC signal as the supplemental projector to ensure synchronism of the shutter to the projection of the subtitles. Alternately, the shutter may be controlled in response to a light sensor that senses the output of the supplemental projector and opens the shutter in response to light above some preset level. This approach assumes that the supplemental projector is modulated to a dark state during "off" states. Another technique would be to monitor the video stream to the supplemental projector and to cause the shutter to be opened when subtitle video is detected.

The controller 34 will normally include a SYNC input card 42 which converts the SYNC input signal to a computer recognizable format that allows it to access the corresponding frame in the storage medium 36, and an output card 44 which converts the subtitle information read from the storage medium to a format suitable for driving the supplemental projector 26. For example, the supplemental projector could be implemented as a video projector, in which case the subtitle information would be formatted as a video signal. For a film or slide projector, the supplemental display information would be provided in a film frame format. For an LCLV, serial text would be provided to activate the desire pixels of the light valve's pixel array.

The controller 34 will also typically include means 45 for controlling the shutter, in synchronism with the time code. The shutter drive control may cause the shutter to open or close instantly or may, optionally, cause the subtitle to be ramped on and off according to desired control slopes. These control slopes can be used to ameliorate the abrupt flashing appearance particularly at the onset of the subtitle presentation, resulting in an improved viewing experience.

Figure 3:
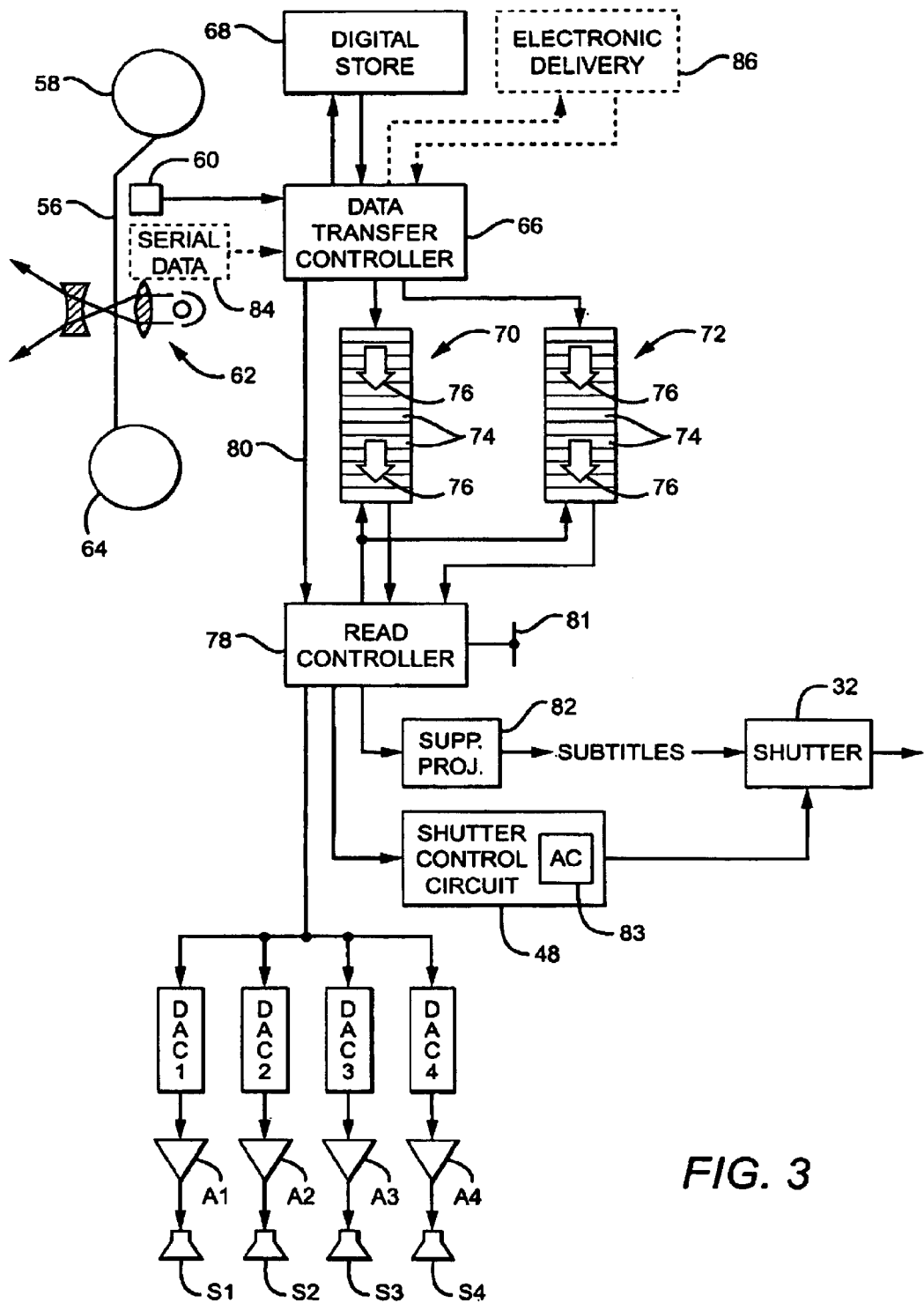
FIG. 3 is a block diagram illustrating the integration of the shuttered subtitling system with a playback system for the motion picture audio track.

A system that can be used to produce both an audio output in the theater and subtitles shuttered and superimposed on the motion picture, in response to a digital time code on the film print, is illustrated in FIG. 3. The motion picture film 56 that includes the time code travels from a play-out reel 58, past a time code reading head 60 and the primary projector 62, to a takeup reel 64. The projector 62 is positioned at a known distance from the time code reader 60, so that the time required for the film to travel from the time code reader to the projector with a normal film advancement speed is precisely known.

The time code information from reading head 60 is transmitted to a data transfer controller 66, such as a conventional IBM® compatible personal computer, that receives the time code data via an input port. The computer 66 manages all of the system's necessary data transfers.

The sound and subtitles for the movie are stored in a digital storage device 68. This may be a CD ROM that is driven by a suitable drive such as a Toshiba XM3300 CD ROM drive, via an SCSI host adapter. Other types of digital data stores could also be used, such as a hard disc drive, a magneto-optic drive (a laser read/write system with a performance similar to a conventional hard disc drive), or even a relatively slow access device such as a digital audio tape (DAT). The primary requirement for the digital data store in this embodiment are (1) its access time must be less than the film travel time from the time code reading head 60 to the primary projector 64, thus assuring that a jump can be made to an out-of-sequence time code within the data store before the corresponding portion of the film has reached the projector, and (2) the data store's average data rate capacity must be greater than the average data rate at which information is read out of a FIFO memory (described below).

The data transfer controller 66 writes the audio data that has been read out of data store 68 into an audio FIFO memory 70, and the subtitle that has been read out of data store 68 into a subtitle FIFO memory 72; both FIFOs are preferably implemented within the microprocessor's conventional RAM memory.

A typical application for a FIFO memory is to receive an input data in bursts, but to read out the data at a constant rate. During periods when no data is received, the data already stored in the memory is progressively read out through its output, with each data byte progressively dropping down through the successive memory cells (represented by bars 74). In this manner the memory "empties" out through its bottom, with the upper memory cells becoming vacant as the readout progresses. The next data burst "fills" the memory, while data continues to be read out at the same rate from its bottom. The flow of information through the memory from "top" to "bottom" is indicated by arrows 76.

The minimum capacity size required for the FIFO memories 70 and 72 is equal to the maximum data access time for the data store 68; the maximum effective FIFO memory capacity for any particular readout rate is equivalent to the film travel time from the time code reading head 60 to the aperture of the primary projector 62. Any additional FIFO memory capacity will not be utilized.

Data is read out from the bottom of the audio and subtitle FIFO memories 70 and 72 by a read controller 78 that transfers data out at a constant rate. To operate the system, data transfer controller 66 simply turns on the FIFO memory read controller 78 via a control line 80 as the first picture frame arrive at the aperture of projector 64. The theater projector is powered from an AC main 81, and the readout of data from the FIFO memories 70 and 72 is phase-locked to the AC mains signal. This allows the time code signals to be used simply to assure that the proper audio and subtitle data is supplied to the input of the FIFO memories 70 and 72, without also having to use it for a positive synchronization of the audio and subtitle playback to the film projection. By synchronizing the reading out of data from the FIFO memories to the AC mains, which also operates the synchronized motor used in the projector, synchronization between the readout of the digital audio and subtitle signals and the projection of the film is assured.

The digital audio signal read out from the audio FIFO memory 70 is transmitted by the read controller 78 to digital-to-analog converters (DACs) for the various theater speakers, illustrated as DACs 1–4 for a four-speaker theater; a single DAC with a multiple output could also be used. The signals are decoded in the usual fashion and amplified by amplifiers A1–A4 for playback in the theater speakers S1–S4.

The subtitle signal read out from the subtitle FIFO memory 72 is transmitted by the read controller 78 to the supplemental projector 82. The particular format in which the subtitle data is stored and read out to the supplemental projector will depend upon the type of projector used The SYNC signal read from the film, or some other source, is transmitted by the read controller 78 to the shutter control circuit 48, which includes a modulatable AC power supply 83 that powers the shutter between its opaque and transparent states. As will be described in detail with reference to FIGS. 6 and 7, the power to the shutter can be ramped or pulse width modulated to (a) smooth the on and off state transitions of the subtitle and (b) balance the perceived subtitle brightness in accordance with scene brightness. This arrangement allows for considerable artistic and technical flexibility in the presentation of the subtitles.

Some possible variations to this system are indicated in dashed lines. Instead of supplying an input synchronization signal directly from the time code read head 60, the synchronization signal could be provided as serial data 84, possibly from a remote location which also controls the film projection instead of the on-site digital data store 68; the audio and subtitle data could be provided via an electronic delivery service 86. Furthermore, the audio information could be eliminated entirely, and the system used only to synchronize the film and subtitle projections.

Figure 1:
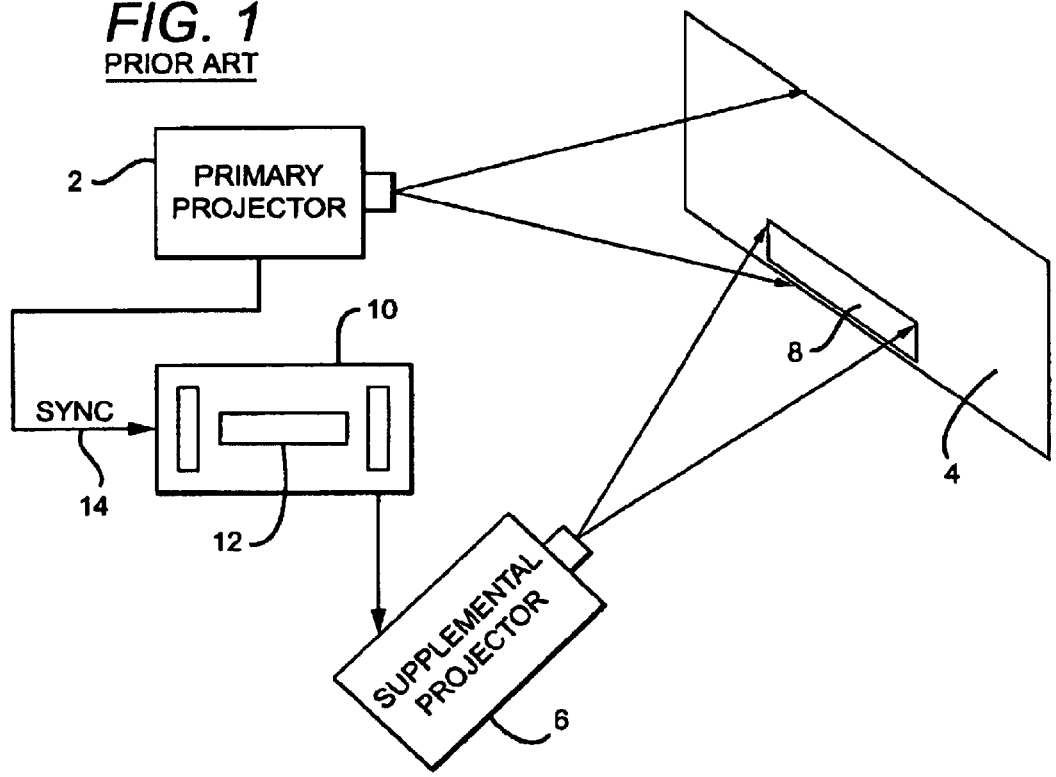
FIG. 1, as described above, is a block diagram of a known dual-projector motion picture system for superimposing subtitles on the motion picture.
Figure 4:
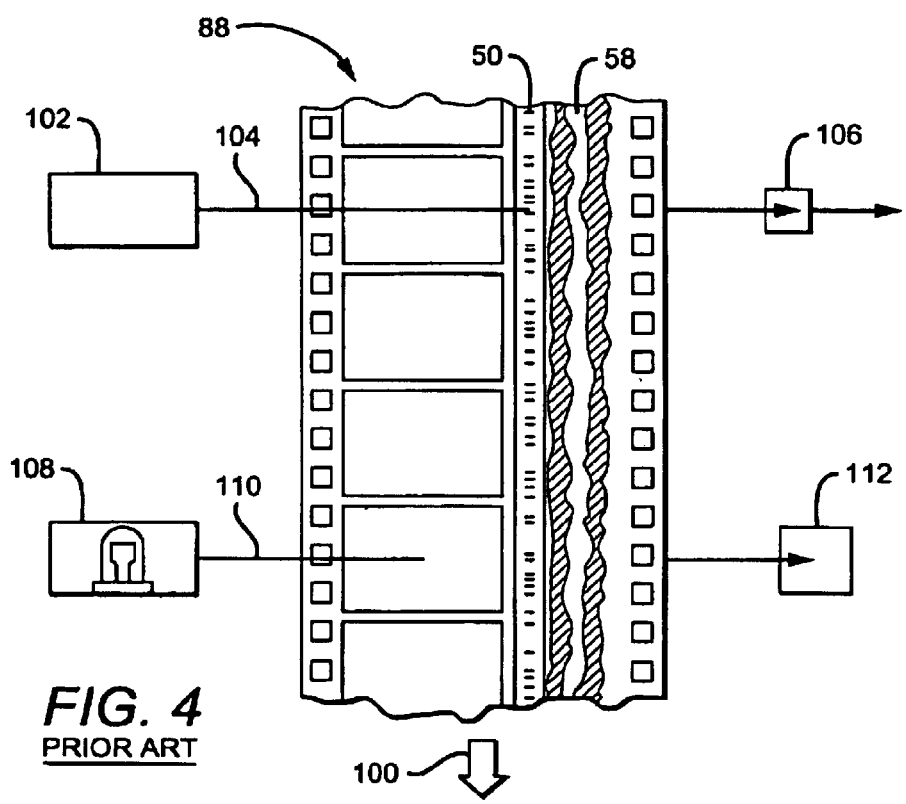
FIG. 4 is a combined plan view and block diagram illustrating how a time code is read from a motion picture film in synchronism with the projection of the motion picture image.

FIG. 4 shows a piece of 35 mm release motion picture film 88 with a digital time code in the Digital Theater System (DTS) format and the manner in which the print film 88 is read during theater projection. A series of sprocket holes 90 lie between the edge 92 of the film and the normal optical sound track area 94. The picture frames are printed by a picture printing head, in an area 98 that is spaced inward from the sound track area 94.

Assume that the film is moving past the projector in the direction of arrow 100. It first passes the digital time code reading head in housing 102, which reads the time code with a colored beam 104 that strikes detector 106 on the opposite side of the film. The film then advances to projection lamp 108. A beam 110 from lamp 108 projects the picture frames onto the theater screen 112.

The picture frames are illuminated by the projection lamp 108 a predetermined period of time after their respective time code units have been read, as determined by the spacing between time code lamp housing 102 and projector 108, and the film speed. This allows time for processing the time code signal, checking its validity, and accessing the proper digital audio and subtitle data. Processing of the time code signal and the production of sound and shuttered subtitles is synchronized with the illumination of the picture frames so that the frames are displayed on the screen at the same time the subtitles and sound derived from their respective digital time codes are respectively superimposed on the film and played back in the theater. When subtitles are not present, the shutter is closed to eliminate the artifact of the subtitle box (milky white rectangle) on the motion picture display.

Figure 5A:
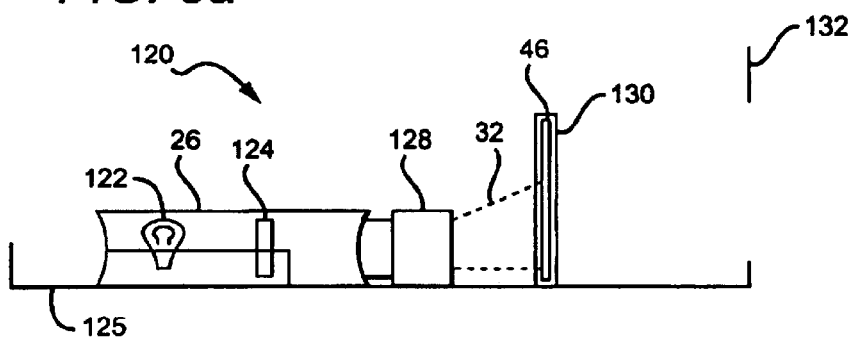
FIGS. 5a and 5b are diagrams of a shuttered supplemental projector assembly in the "off" and "on" states, respectively, that eliminates the unwanted subtitle artifact.
Figure 5B:
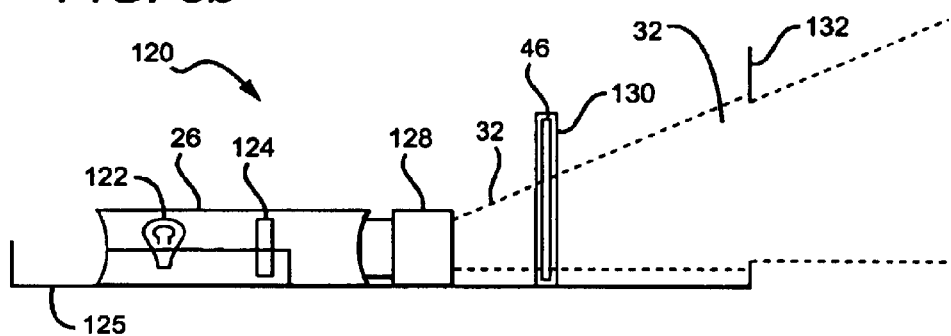

FIGS. 5a and 5b are diagrams of a shuttered supplemental projector assembly 120 in its "off" and "on" states, respectively. Supplemental projector suitably includes a high intensity lamp 122 and a modulator array 124 and is mounted on a bracket 126. Modulated light beam 32 passes through a lens 128, which forms the image and projects it onto the motion picture screen. Shutter 46 is secured in a holder 130 in and suitably substantially perpendicular to the optical path to intercept light beam 32. When the subtitles are absent, the shutter 46 is in its "off" state and substantially attenuates the light to effectively improve the supplemental projector's dark or off state. Certain shutter configurations such as a mechanical dowser will block or absorb the incident light, which provides the best dark state performance but may cause heating and other problems. A currently preferred implementation is the E/O diffuser, which attenuates and diffuses the light. The E/O diffuser does allow some light to pass but destroys any structure in the image and spreads the light over the region surrounding the subtitle rectangle. The result is an imperceptible degradation of the motion picture's dark state. When subtitles are present, shutter 46 is switched to its "on" state and passes substantially all of the light to superimpose the subtitle on the motion picture. Masking plane 132 masks the subtitle to fit within the desired portion on the motion picture.

Figure 6:
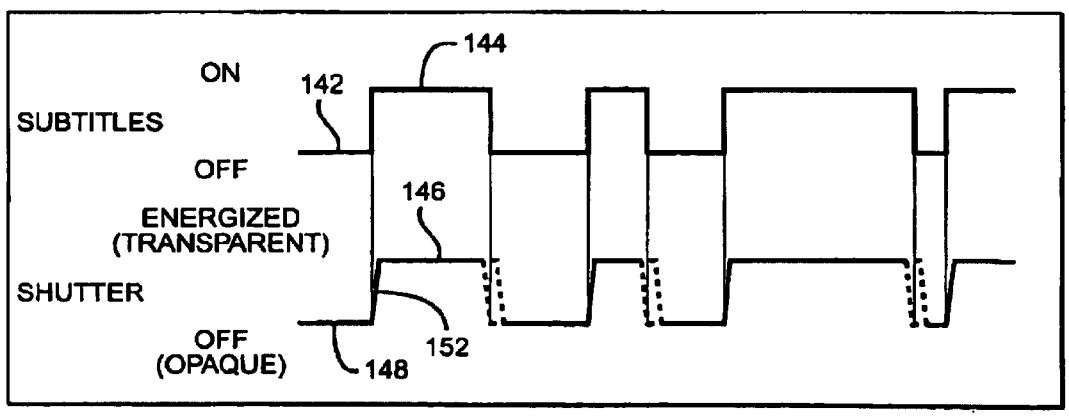
FIG. 6 is a timing diagram for driving the shutter to eliminate the transient brightness and color balance artifact.

FIG. 6 is a timing diagram 140 for driving the shutter to eliminate the transient fluctuation in brightness and color balance when the subtitles are projected. In accordance with the SYNC signal, the subtitle "off" state corresponds to the absence of a subtitle at that point in the motion picture and a subtitle "on" state corresponds to the presence of a subtitle. In response to the SYNC signal, during the "off" state 142 the light beam is either unmodulated or, preferably, modulated to a dark state. During the "on" state 144 the light beam is modulated to form an image of the desired subtitle in synchronism with the projection of the motion picture. In general, the controller causes the shutter to switch between its transparent on state 146 and its translucent state 148 to pass the modulated light beam during "on" states in synchronism with the motion picture so the subtitles are superimposed at desired times on desired portions of the motion picture and to substantially attenuate the light beam during "off" states.

In one embodiment, the controller will ramp the shutter from its translucent state through variable transmission states to its transparent state slowly enough to be perceivable. By controlling the slope 152, the abrupt flashing that appears at the onset of the subtitle presentation is ameliorated, resulting in an improved viewing experience. The shutter is suitably ramped between its translucent and transparent states in 100–500 ms. Switching times of less than approximately 100 ms are not generally perceivable. Slope control requires a shutter implementation that can continuously vary the transparency from opaque to transparent over the entire shutter area simultaneously. The E/O diffuser, and LCLV exhibit these properties whereas the mechanical dowser does not.

Although the scene brightness in motion pictures varies constantly, subtitles are usually superimposed at full brightness levels either through the traditional techniques of imprinting the subtitles onto the film or through the use of a supplemental projector. In certain dark scenes the brightness of the subtitles can be distracting. This artifact is ameliorated by adjusting the subtitle brightness levels as a function of scene brightness.

Subtitle brightness can be adjusted in a number of open loop configurations such as by inserting brightness control data, which corresponds to the scene brightness in the motion picture coincident in time with each subtitle, into the subtitle files.

In a first rather crude approach, the technician charged with creating the subtitle files that are stored in storage media 36 can use this information to change the brightness levels when the subtitles are created. In a second approach, the scene brightness would be stored as an auxiliary code with each corresponding subtitle. Upon receipt of the SYNC signal, the controller would read the subtitle file and direct the subtitle information and brightness code to the supplemental projector, which would adjust the brightness of the subtitle accordingly. In a third approach, the controller would read the subtitle file and direct the subtitle information to the supplemental projector and the brightness data to the shutter control circuit. The shutter control circuit would adjust the transmission of the shutter to provide the desired brightness level.

Figure 7:
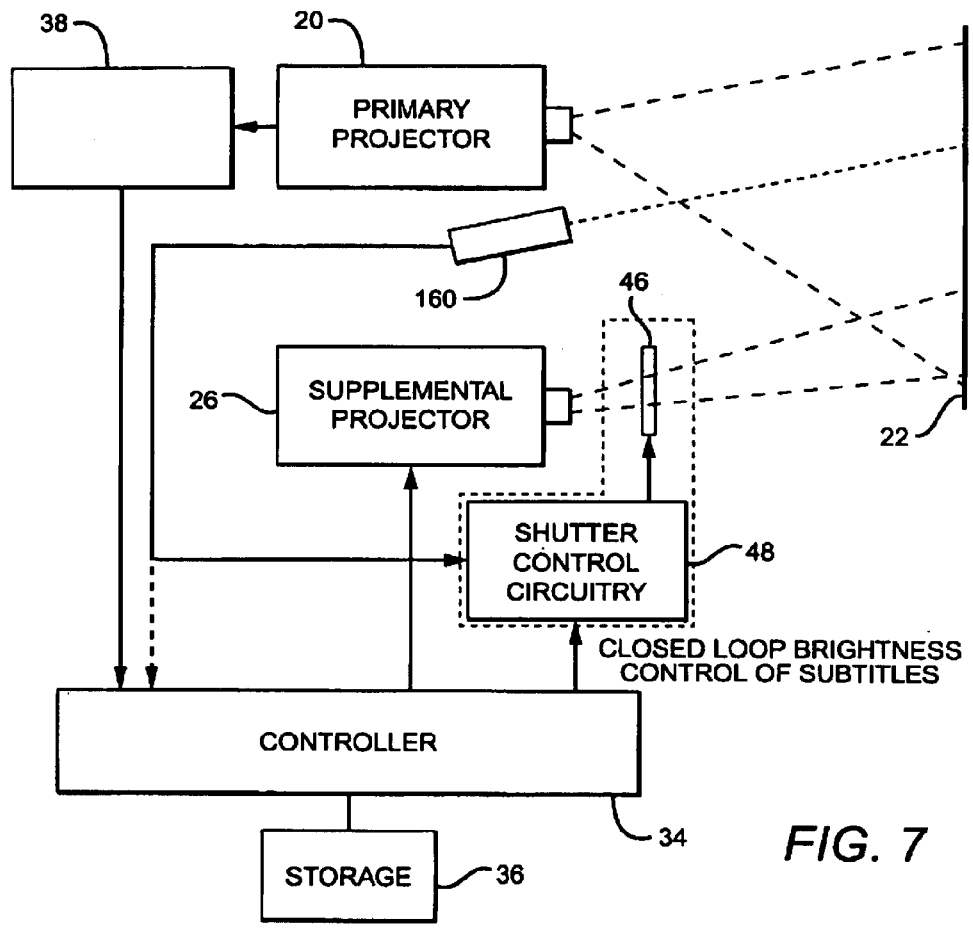
FIG. 7 is a block diagram illustrating a closed-loop system for adjusting subtitle brightness.

As shown in FIG. 7, subtitle brightness can be adjusted in a closed loop system by directing one or more light sensors 160 at the screen to measure the brightness of the motion picture scene. The brightness data is fed back to the controller 34 or shutter control circuit 48, which calculates the brightness adjustment for the subtitle and sends a control signal to the shutter control circuit, which in turn controls the transparency of the shutter. The brightness adjustment can be calculated in any number of ways. For example, the average brightness of the subtitle could be matched to the average scene brightness or some offset ratio above or below the average scene brightness. This closed loop process can be continuous so that if the scene brightness changes during the projection of the subtitle that subtitle will adjust accordingly, or the intensity of the subtitle can be set and held during the entire time it is being projected. This is an artistic choice. The E/O diffuser supports this technique whereas the mechanical dowser does not.

Figure 8A:
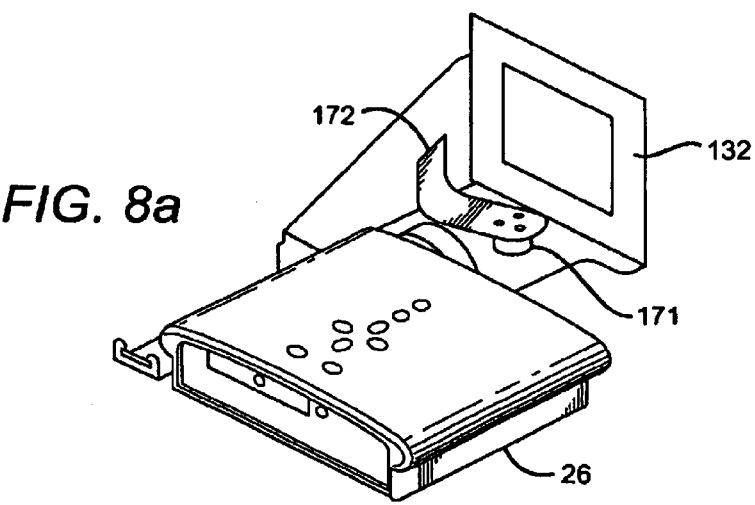
FIGS. 8a through 8c are block diagrams of different shutter configurations including a mechanical dowser, a LCLV and an E/O diffuser.
Figure 8B:
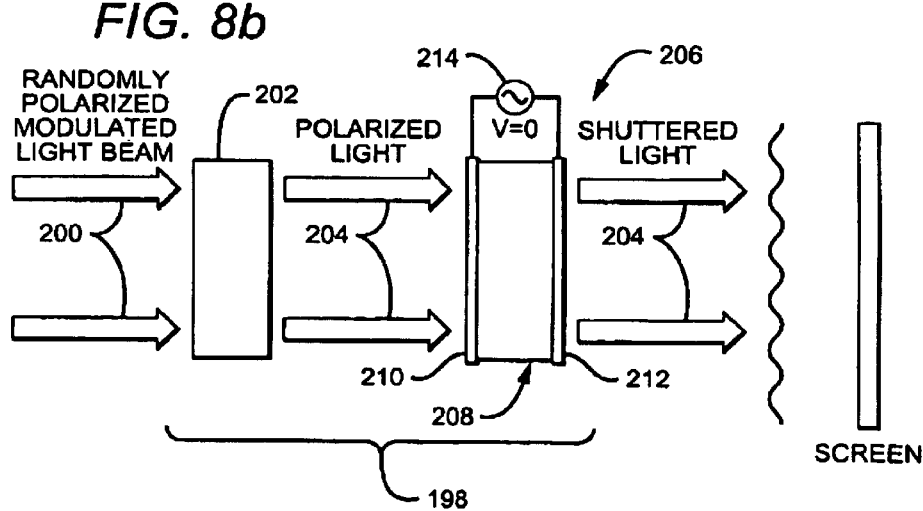
Figure 8C:
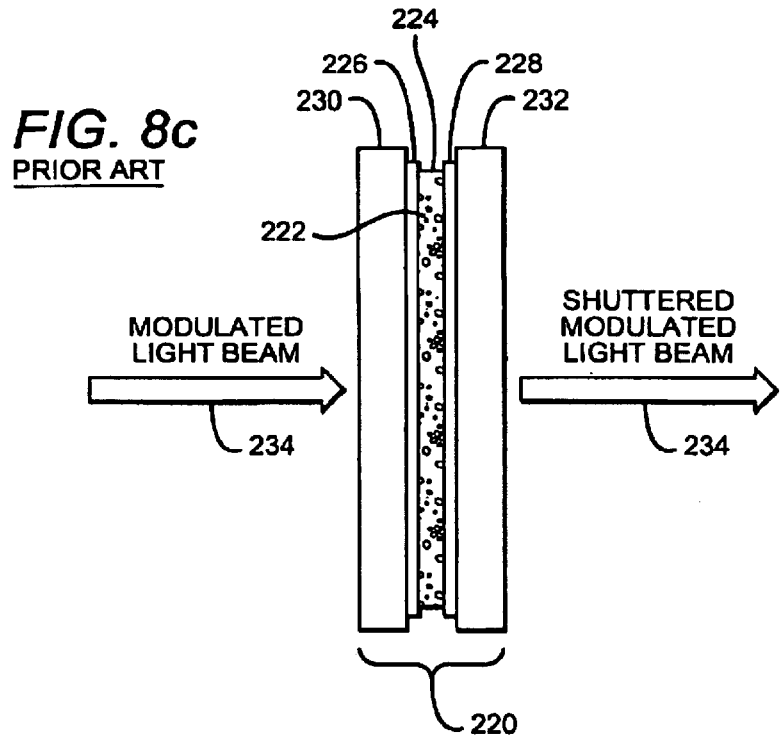

FIGS. 8*a* through 8*c* are block diagrams of different shutter configurations including a mechanical dowser, a LCLV, and an E/O diffuser. As shown in FIG. 8*a*, the supplemental projector 26 is attached to a mechanical dowser typically including an electrical solenoid 171 and an opaque medium 172 such as a piece of metal which the solenoid can move in a manner to allow passage or blockage of the light from the subtitle projector through masking plane 132 to the screen. A signal is sent from the controller 34 to solenoid 171 to move the opaque medium 172 allowing passage of the modulated light beam to the screen. The dowser may be opened or closed in response to a control signal from the subtitle processor. There is no brightness control possible with this mechanical dowser as shown. It is either fully open or fully closed.

A disadvantage of the mechanical dowser is that it has moving parts, which are subject to wear. It should be noted that a typical feature film can contain up to 2000 subtitles resulting in many cycles of the mechanical dowser. An additional disadvantage of the mechanical dowser is difficulty in creating a design that does not produce annoying mechanical noise during operation. This mechanical noise can be particularly troublesome if the subtitling projector is mounted in the audience area of a movie house, as is sometimes the case.

As shown in FIG. 8*b*, the shutter comprises a LCLV, which shutters the light between the on and off states and can provide the desirable variable transmission characteristics. A LCLV 198 comprises an S or P polarizer 202 and a modulator 206, which includes a layer of liquid crystal material 208 sandwiched between a pair of transparent conductive layers 210 and 212, suitably Indium-Tin oxide. The supplemental projector's high intensity lamp produces a randomly polarized light beam 200. When this beam passes through polarizer 202 one-half of the light is lost and the output light beam 204 is either S or P polarized. A controllable AC voltage source 214 applies a potential between ITO layers 210 and 212. When the applied potential is zero, the liquid crystals remain 90° with respect to the polarization of light beam 204 so that substantially all of the light is absorbed or diffused. This corresponds to the translucent off state. When a sufficiently large voltage is applied, the liquid crystals will rotate a full ninety degrees so that they are aligned with the polarization of light beam 204 allowing the shuttered light beam 204 to pass with low loss to superimpose the subtitles on the motion picture. This corresponds to the transparent, or on state. A variable transmission property is achieved by controlling the applied voltage between 0V and the fully on voltage. Typically, LCLVs that are used in projection displays require sophisticated addressing circuitry to address individual pixels. However, when used as a shutter, sheet electrodes address all the pixels in the same manner. LCLVs are well known in the art and well established commercial products. A disadvantage of a LCLV in this application is the loss of light, at least 50% and typically about 75%, and the heat absorption at the modulator which can shorten it's life.

As shown in FIG. 8*c*, the shutter comprises an electo-optical diffuser 220 made of a polymer dispersed liquid crystal (PDLC) material, which includes PDLC droplets 222 dispersed in a polymer matrix 224. The PDLC technology was developed by Joseph Doane and John West at Kent State University and is described in detail in a series of U.S. Pat. Nos. 4,671,618; 4,673,255; 4,685,771; 4,688,900; 4,888,126; 4,890,902; 4,994,204; 5,004,323; 5,240,636 and 5,264,950, which are hereby incorporated by reference. Polymer matrix 224 is sandwiched between a pair of conductive layers 226 and 228, suitably ITO, which are in turn sandwiched between a pair of transparent protective layers 230 and 232, suitably polyester or glass. In the "off" state, the PDLC droplets 222 are randomly aligned so that their ordinary refractive index ($n_o$) does not match that of the polymer ($n_p$) in which they are dispersed. The material appears translucent and causes the light to scatter. When an electric field is applied across the material, the PDLC droplets reorient so that their extraordinary ($n_e$) refractive index matches that of the polymer. More specifically, the polymer has orthogonal ordinary and extraordinary refractive indices $n_o'$ and $n_e'$. The matrix and droplets are selected so that the respective orthogonal components are equal. However, absent an applied field the droplets are randomly aligned, which effectively produces a index mismatch and a translucent state. When a field is applied, the droplets, hence their orthogonal indices are aligned with the polymer and the material appears transparent. The material is substantially transparent and passes the modulated light beam 234 with very low loss, e.g. 10 to 25 percent, and minimal scattering. The transmission properties of the material are continuously variable by controlling the mismatch between the droplets refractive index and that of the polymer through modulation of the electric field.

To cover the entire subtitle image, the shutter must be fairly large, e.g. 4 in×4 in. The PDLC material, which is currently used to provide privacy glass in, for example, conference rooms, is available in large sizes at low cost. The large size is also useful to disperse and radiate heat from the high intensity lamp. The PDLC material also has the advantage that its optical transmission characteristic is continuously variable with the applied electric field. This property facilitates the slope control described in FIG. 6 to eliminate the transient fluctuation artifact as well as the subtitle brightness control described in FIG. 7.

Figure 9A:
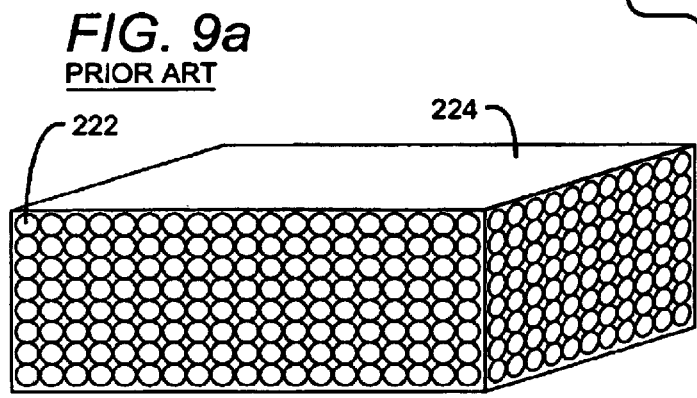
Figure 9B:
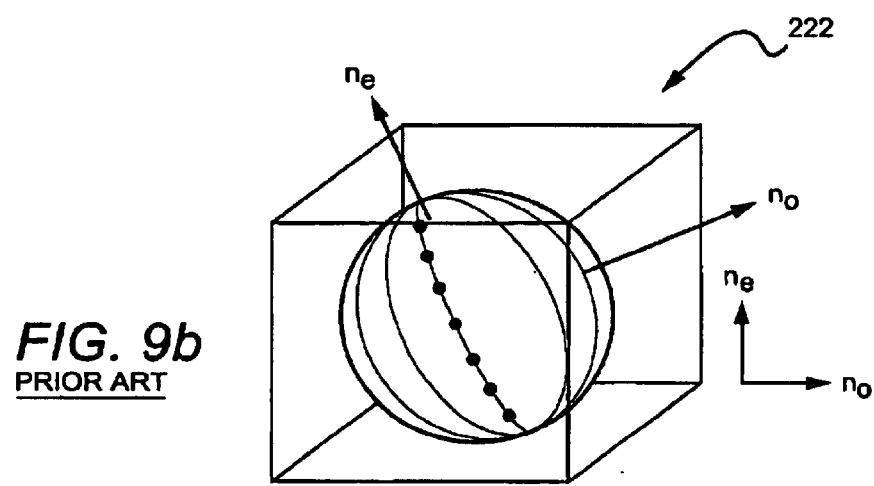

Each, of the mechanical dowser, LCLV and E/O diffuser have advantages and disadvantages. The ideal shutter would have the following properties: rapidly switch between fully on & off states, an on state approaching 100% transmission, an off state approaching 100% absorption or scattering, slope control of the on state and the off state, and continuously variable transmission properties between the on & off states, across the entire surface of the device simultaneously. Although the E/O diffuser is the currently preferred embodiment because it provides low light loss in the on state, good light scattering properties in the off state, slope control and variable transmission in sufficiently large form factors at a low cost, the diffusion of light still projects some light onto the than diffuse the light thereby providing, in theory, better off state performance FIGS. 9*a* through 9*b* illustrate the PDLC layer and a single PDLC crystal in more details. PDLC droplets 222 are dispersed in a polymer matrix 224. Matrix 224 is approximately 10–50 microns thick and populated with 1–10 microns droplets. Each liquid crystal droplet 222 includes a nematic liquid crystal 226 inside the polymer matrix 224. An AC voltage source 236, suitably 65V, applies an electric field across the pair of ITO layers. When the field is not applied, the PDLC crystals are randomly aligned and the refractive indices of the crystals and polymer do not match, which serves to scatter incident light as shown in FIG. 9c. When a sufficiently strong field is applied, the PDLC crystals align, which causes the refractive indices to match, which turns the material largely transparent as shown in FIG. 9d. The material's transmission varies continuously across the entire surface of the device between the un-energized and fully energized states, to provide the variable transmission necessary for remedying the aforementioned visual artifacts.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A system for superimposing subtitles on a motion picture projected from a primary projector, comprising:
    A supplemental projector separate from the primary projector and arranged to modulate a light beam during an "on" state to superimpose subtitles on said motion picture,
    A shutter positioned in the supplemental projector's optical path to alternately pass and attenuate the light beam, and
    A controller arranged to receive said subtitles from a storage medium, to provide the subtitles to said supplemental projector in synchronism with the projection of said motion picture, and to alternately cause said shutter to pass said modulated light beam during said "on" state in synchronism with the motion picture so said subtitles are superimposed at desired times on desired portions of said motion picture and cause said shutter to substantially attenuate said light beam during an "off" state;
    wherein the shutter comprises one of an LCLV or an E/O diffuser.

2. The system of claim 1, wherein the shutter is an E/O device that is characterized by a translucent state in which light is substantially diffused, a transparent state in which light is substantially passed, and a plurality of intermediate transmission states therebetween.

3. A The system of claim 2, wherein the E/O device is an E/O diffuser that comprises a polymer dispersed liquid crystal (PDLC) material.

4. The system of claim 2, wherein said shutter is adapted to make a gradual transition from the translucent state through at least one of said intermediate transmission states to the transparent state, in response to said controller.

5. The system of claim 4, wherein the transition from the translucent state to the transparent state takes at least 100 ms.

6. The system of claim 2, wherein each subtitle is stored with brightness control data, which is a measure of the scene brightness in the motion picture coincident with the each said subtitle, said controller being responsive to the brightness control data to control the shutter's transmission and adjust the brightness of the superimposed subtitle.

7. The system of claim 2, further comprising at least one sensor that measures the scene brightness, said controller being responsive to the scene brightness to control the shutter's transmission and adjust the brightness of the superimposed subtitle.

8. The system of claim 1, wherein the brightness of each subtitle is adjusted in accordance with the scene brightness in the motion picture coincident in time with each said subtitle.

9. The system of claim 1, wherein said shutter is capable of continuously varying its transparency over its entire shutter area simultaneously.

10. A system for superimposing subtitles on a motion picture projected from a primary projector, comprising:
    A supplemental projector separate from the primary projector and arranged to modulate a light beam during an "on" state, to superimpose subtitles on said motion picture,
    An electro-optic diffuser positioned in the supplemental projector's optical path to alternately pass and diffuse the light beam, and
    A controller arranged to receive said subtitles from a storage medium, to provide the subtitles to said supplemental projector in synchronism with the projection of said motion picture, and to alternately cause said electro-optic diffuser to pass said modulated light beam during the "on" states in synchronism with the motion picture so said subtitles are superimposed at desired times on desired portions of said motion picture and cause said electro-optic diffuser to diffuse said light beam during an "off" state.

11. The system of claim 10, wherein the electro-optic diffuser is characterized by a translucent state in which light is substantially diffused, a transparent state in which light is substantially passed, and a plurality of intermediate transmission states therebetween.

12. The system of claim 11, wherein the electro-optic diffuser comprises a polymer dispersed liquid crystal (PDLC) material.

13. The system of claim 11, wherein said electro-optic diffuser is capable of making a gradual transition from the translucent state through at least one of said intermediate transmission states to the transparent state;
    and wherein at the onset of an "on" state the controller ramps the electro-optic diffuser's transmission from the translucent state through at least one of said intermediate transmission states to the transparent state.

14. The system of claim 13, wherein the transition from the translucent state to the transparent state takes at least 100 ms.

15. The system of claim 11, wherein each subtitle is stored with brightness control data, which is a measure of the scene brightness in the motion picture coincident with the each said subtitle, said controller being responsive to the brightness control data to control the electro-optic diffuser's transmission and adjust the brightness of the superimposed subtitle.

16. The system of claim 11, further comprising at least one sensor that measures the scene brightness, said controller being responsive to the scene brightness to control the electro-optic diffuser's transmission and adjust the brightness of the superimposed subtitle.

17. A system for superimposing subtitles on a motion picture projected from a primary projector, comprising:
    A supplemental projector separate from the primary projector and arranged to modulate a light beam during an "on" state to superimpose subtitles on said motion picture, An electro-optic shutter characterized by a variable transmission between a translucent state and a transparent state, said electro-optic shutter being positioned in the supplemental projector's optical path to alternately diffuse and pass the light beam, and A controller arranged to receive said subtitles from a storage medium, to provide the subtitles to said supplemental projector in synchronism with the projection of said motion picture, and to alternately cause said electro-optic shutter to pass said modulated light beam during the "on" state in synchronism with the motion picture so said subtitles are superimposed at desired times on desired portions of said motion picture and cause said electro-optic shutter to diffuse said light beam during "off" states, said controller being responsive to scene brightness of said motion picture to control the transmission of the electro-optic shutter thereby adjusting the brightness of the superimposed subtitle to the scene brightness.

18. The system of claim 17, wherein the E/O shutter is an E/O diffuser that comprises a polymer dispersed liquid crystal (PDLC) material.

19. The system of claim 17, wherein each subtitle is stored with brightness control data, which is a measure of the scene brightness in the motion picture coincident with the each said subtitle.

20. The system of claim 17, further comprising at least one sensor that measures the scene brightness.

21. A method of superimposing subtitles on a motion picture, comprising:

projecting a primary light beam modulated with a motion picture onto a screen, projecting a supplemental light beam toward the screen, in synchronism with the motion picture, modulating the supplemental light beam with a desired subtitle at the desired time, and in synchronism with the presence and absence of said subtitles, respectively, opening a shutter to pass the modulated supplemental light beam to superimpose the subtitle onto a desired area of the screen in synchronism with the motion picture, and closing the shutter to substantially diffuse the unmodulated supplemental light beam;

wherein said step of opening a shutter comprises ramping said shutter from a translucent state through variable transmission states to a transparent state slowly enough to be perceivable.

22. The method of claim 21, further comprising, controlling the opening of the shutter to perceptibly ramp the transmission of the shutter, hence perceptibly ramp the brightness of the superimposed subtitle.

23. The method of claim 21, wherein the ramping of the transmission takes at least 100 ms.

24. The method of claim 21, wherein each subtitle is stored with brightness control data, which is a measure of the scene brightness in the motion picture coincident with each said subtitle, further comprising adjusting the transmission of the shutter in accordance with the brightness control data to adjust the brightness of the superimposed subtitle.

25. The method of claim 21, further comprising, sensing the scene brightness of the projected motion picture, and adjusting the transmission of the shutter in accordance with the brightness control data to adjust the brightness of the superimposed subtitle.

26. The method of claim 21, wherein the shutter comprises a polymer dispersed liquid crystal (PDLC) material.

27. The method of claim 21, wherein said step of ramping said shutter from a translucent state through variable transmission states to a transparent state further comprises:

varying its transparency over its entire shutter area simultaneously.

* * * * *